United States Patent
Kalliokulju et al.

(10) Patent No.: US 6,741,843 B1
(45) Date of Patent: May 25, 2004

(54) METHOD AND ARRANGEMENT FOR SERVICE-BASED INDICATION AND CONTROL OF A SERVICE NEED

(75) Inventors: Juha Kalliokulju, Vesilahti (FI); Satu Ruuska, Vesilahti (FI)

(73) Assignee: Nokia Mobile Phones Ltd., Espoo (FI)

( * ) Notice: Subject to any disclaimer, the term of this patent is extended or adjusted under 35 U.S.C. 154(b) by 321 days.

(21) Appl. No.: 09/613,883

(22) Filed: Jul. 11, 2000

(30) Foreign Application Priority Data

Jul. 12, 1999 (FI) .................................................. 991593

(51) Int. Cl.⁷ ................................................ H04Q 7/20
(52) U.S. Cl. ................ 455/226.1; 455/226.2; 455/226.4; 455/414.1; 455/452.2
(58) Field of Search ................................. 455/566, 567, 455/575, 466, 226.1, 226.2, 226.4, 452.1, 452.2, 414.1

(56) References Cited

U.S. PATENT DOCUMENTS

| | | | |
|---|---|---|---|
| 5,070,536 A | | 12/1991 | Mahany et al. ................ 455/67 |
| 5,239,684 A | | 8/1993 | Ishikura ...................... 455/67.7 |
| 5,390,365 A | * | 2/1995 | Enoki et al. ................ 455/54.1 |
| 5,450,613 A | * | 9/1995 | Takahara et al. ........... 455/54.1 |
| 5,509,002 A | | 4/1996 | Baden et al. .................. 370/18 |
| 5,703,902 A | * | 12/1997 | Ziv et al. ..................... 375/228 |
| 5,710,981 A | * | 1/1998 | Kim et al. .................. 455/33.1 |
| 5,732,328 A | * | 3/1998 | Mitra et al. ................... 455/69 |
| 5,924,029 A | | 7/1999 | Sohngen et al. ............ 455/423 |
| 6,014,561 A | * | 1/2000 | Mölne ......................... 455/419 |
| 6,078,816 A | * | 6/2000 | Weiss et al. ................ 455/450 |
| 6,131,046 A | * | 10/2000 | Sano et al. .................. 455/566 |
| 6,353,870 B1 | * | 3/2002 | Mills et al. .................. 710/301 |
| 6,668,159 B1 | * | 12/2003 | Olofsson et al. ......... 455/226.1 |

FOREIGN PATENT DOCUMENTS

EP 0762669 A3 3/1997

* cited by examiner

*Primary Examiner*—William Trost
*Assistant Examiner*—James D Ewart
(74) *Attorney, Agent, or Firm*—Perman & Green, LLP

(57) ABSTRACT

The invention relates to a method and arrangement by means of which a mobile station (MS, 400) operating in a cellular network measures and indicates the field strength of a signal sent by a base station (BTS, 451). From the measured signal it is calculated a virtual field strength (Pvr) on the basis of which it is determined whether the desired service (speech, data, GPRS, HSCSD) can be used at that field strength.

23 Claims, 3 Drawing Sheets

Figure 3A:
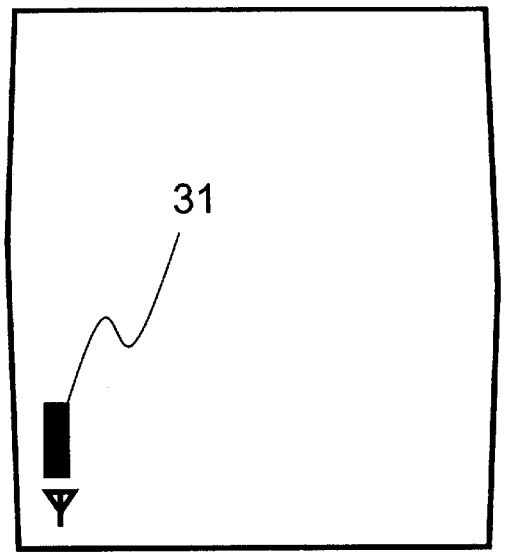

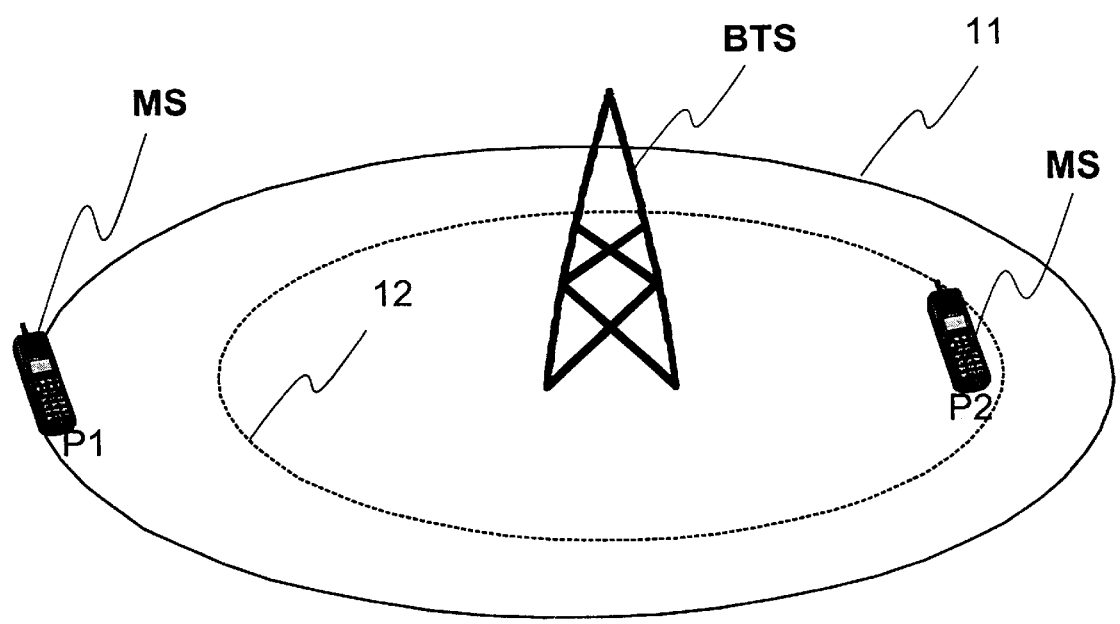
Fig. 1
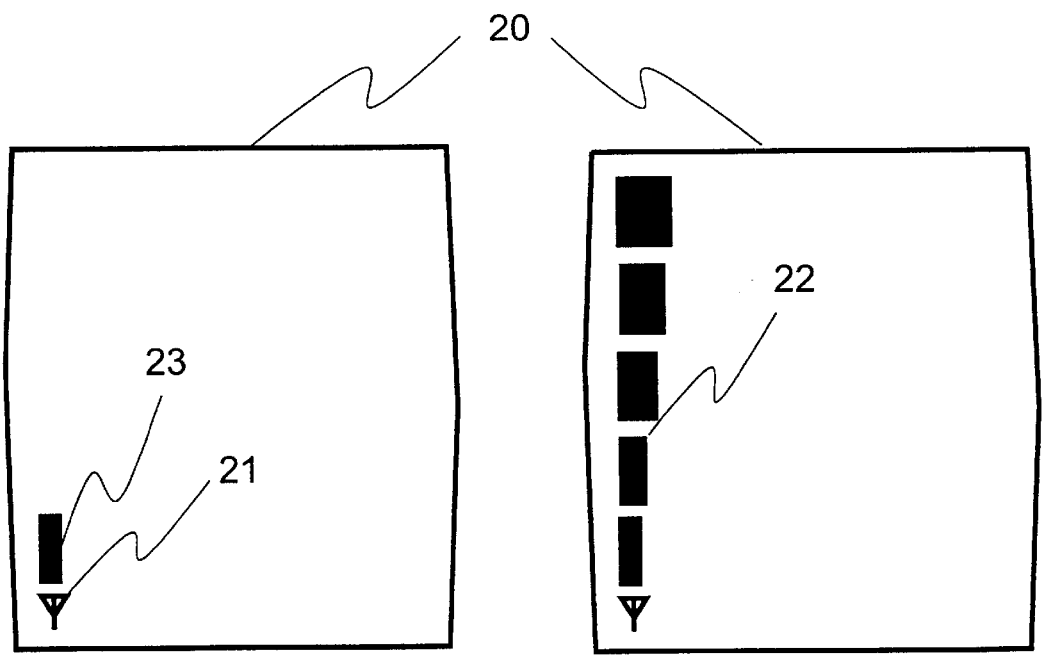
Fig. 2a
PRIOR ART
Fig. 2b
PRIOR ART

METHOD AND ARRANGEMENT FOR SERVICE-BASED INDICATION AND CONTROL OF A SERVICE NEED

The present invention relates to a method and arrangement for measuring and indicating the field strength of a signal received by a mobile station operating in a cellular network. The invention also relates to a mobile station in a cellular telephone system, comprising means for sending and receiving signals, means for measuring the field strength of a signal, and means for reading data into a storage means in the mobile station. The invention also relates to a cellular radio system that comprises switching centers, base station controllers, base stations and mobile stations, and in which the base stations are provided with means for generating messages and for sending said messages to mobile stations, and the mobile stations are equipped so as to operate on a certain service level and receive said messages.

In cellular telephone systems the conditions of the locations of the different mobile stations in a cell are different with respect to the location of the base station. Some mobile stations are located near the base station without interfering obstructions between them. On the other hand, a mobile station may be located on the outskirts of a cell, or there may be an obstacle between it and the base station that attenuates the signal, or signals of other mobile stations may interfere with the operation of the mobile station. Mobile stations located in poor conditions have to use high transmission power so that their signals be on an acceptable level as they arrive in the base station. If the conditions are good, on the other hand, a high transmission power unnecessarily drains the battery of the mobile station and, at the same time, the mobile station's signal unnecessarily interferes with the signals of the other mobile stations in the same cell. The transmission power applied by the mobile station can be controlled by the base station if the service provider so wishes, see e.g. Michelle Mouly & Marie-Bernadette Pautet: The GSM System for Mobile Communications, chapter 6.1.5.1. In the GSM system, for example, the transmission power of a mobile station, like that of a base station, can be changed by about 30 dB in 2-dB steps at intervals of 60 ms. The control information is based on data obtained from a received signal level measurement carried out by the base station and mobile station.

The mobile station measures and indicates the received field strength. The measured field strength can be displayed to the user as a graphic indication on the mobile station. On the basis of the measurement result the mobile station decides whether or not the measured field strength meets the requirements for the connection. The prior-art field strength measurement indication was developed during the early stages of GSM (Global System for Mobile communications) standards when all that were used were mainly the basic services, such as speech transmission and slow data transmission. At the moment, however, there are additional services available that can be utilized in a GSM cellular network. These include e.g. fast data transmission at 14.4 kbps, general packet radio service (GPRS), and high speed circuit switched data (HSCSD) services. For example, the error correcting coding used on the faster 14.4 kbps channel had to be reduced so that a greater amount of data can be transferred on the channel. Along with increased data transmission rates it has been necessary to tighten up the field strength requirement on the connection so that errors occurring in the signal on the transmission path can be reduced to such an extent that the channel coding in use is able to correct the errors. The mobile station, however, measures and indicates the field strength as an absolute value just like before. Points $P_1$ and $P_2$ in FIG. 1 show, by way of example, the field strength indicated by the mobile station in accordance with FIGS. 2a and 2b. In FIGS. 2a and 2b the field strength is shown on the display unit of the mobile station 20 using e.g. a vertical piecewise-continuous line 22, 23 above the symbol depicting an antenna 21. If, for example, the vertical line on the display unit 20 of the mobile station shows five indicator blocks 22, like in FIG. 2b, the field strength is optimal for GSM use. If the display shows only one indicator block 23, like in FIG. 2a, the field strength value is near the lower limit of operation, but the link is still acceptable. If there are no field strength indicating blocks at all above the antenna symbol 21 or the antenna symbol is missing, the field strength is insufficient for communication and no link can be established.

When using absolute field strength indication, it is possible to have a situation in which the field strength indication 23 indicates sufficient field strength but in reality the communication link will not function as desired with the service selected by the user. In the case of FIG. 1, two different operating ranges can be drawn, by way of example, around the base transceiver station (BTS) such that the outer circle 11 meets the GSM basic operation requirements at 9.6 kbps. However, the other GSM service shown in FIG. 1, fast data transmission at 14.4 kbps, can only be accomplished inside the inner circle 12, say, at point $P_2$, since the channel coding used on a fast transmission link cannot correct all errors generated on the transmission path when the mobile station is located at point $P_1$. In the situation depicted by FIG. 1, it is difficult for the user, while at point $P_1$, to understand why the fast data transmission will not work although the prior-art field strength indicator in the mobile station indicates that the field strength is sufficient for transmission, as shown in FIG. 2a. At point $P_2$ the prior-art absolute field strength indication is in accordance with FIG. 2b, and at $P_2$ the both services will work because the channel coding used on the faster transmission channel is able to correct the errors possibly generated on the transmission channel.

To remove the problem, various improvements have been proposed in order to enhance the services provided by the GSM system. U.S. Pat. No. 5,732,328 discloses a method in which the mobile station is controlled so as to change its transmission power in accordance with the information class of the signal itself, such as speech, data, or video, for instance. According to experience, the error tolerances of these different information classes are different. For example, normal speech transmission tolerates interference and even momentary disconnections better than pure data transmission. Statistically, then, the transmission power of the mobile station can be controlled according to the information contents of its signal. Data transmission, for example, needs higher transmission power than speech transmission.

The transmission power of a mobile station may also be controlled according to a method disclosed in U.S. Pat. No. 5,710,981 without direct control from the base station. The signal received by the mobile station described in said patent publication is degraded by means of a circuit in the mobile station in a controlled manner until it reaches a level where the quality of the signal is unacceptable. Since the mobile station has received information about the transmission power of the base station, it can now make a calculation of the transmission path losses and, based on that, the transmission power of the mobile station itself can be set as desired with respect to power consumption, signal quality and interference caused.

However, the basic problem remains. The mobile station measures and, if necessary, indicates the absolute value of the measured field strength. The field strength can be adjusted in the methods described above by changing the transmission power of the mobile station when necessary. However, the need for additional power is different for the different value-added services offered in the cellular network in question and, therefore, one single absolute measurement value will not provide sufficient data to form a basis for the decision about whether the field strength in question is sufficient for establishing the desired service link which may comprise several different value-added services. Often a mobile station employing the prior-art methods makes an attempt to establish the link and only after an unsuccessful attempt it is found that the field strength is insufficient.

An object of the invention is to reduce said disadvantages associated with the prior art.

The method according to the invention is characterized in that the value representing the field strength of the received signal is calculated at least partially on the basis of the service used by the mobile station.

The mobile station according to the invention is characterized in that it comprises means for calculating and indicating a value representing the field strength of the received signal as well as means for setting a minimum value for the field strength of the signal received by the mobile station on the basis of the service used by the mobile station.

The base station according to the invention is characterized in that it comprises means for communicating a service-specific value (Off) needed by mobile stations to calculate a value representing the field strength of the received signal to the mobile stations and means for controlling the transmission power on the basis of the service-specific values (Off).

The cellular network according to the invention is characterized in that a cellular radio system comprises accessible information about the field strength service-specific values (Off) allowed in the cellular network and said system is arranged so as to transmit said information from a base station to a mobile station for the calculation and indication of a value representing the field strength of the received signal.

Some preferred embodiments of the invention are disclosed in the dependent claims.

The main idea of the invention is as follows: Instead of measuring and indicating the absolute field strength the mobile station uses a virtual field strength dependent on the data contents of the signal. A mobile station registered to a service fetches from its memory an offset value to adjust the absolute field strength value. This way it is found out whether the desired service can be used with the current measured absolute field strength value. The transmission power used by the mobile station is controlled in a service-based manner so that it meets the requirements set on the field strength. Thus the mobile station will know, and can also indicate to the user, if necessary, prior to the establishment of the communications link, whether or not a link with the desired service can be established or not.

An advantage of the invention is that as soon as the user has indicated his service need he is informed about whether the measured field strength meets the field strength requirement of the desired service. This way, unnecessary, unsuccessful connection attempts can be reduced.

Another advantage of the invention is that if the user insists to connect to a service that requires a great field strength because of weak channel coding, the transmission power of the mobile station can be increased in a controlled manner above the normal transmission power level for the duration of data transmission. The user may be charged extra for such a function.

Figure 3B:
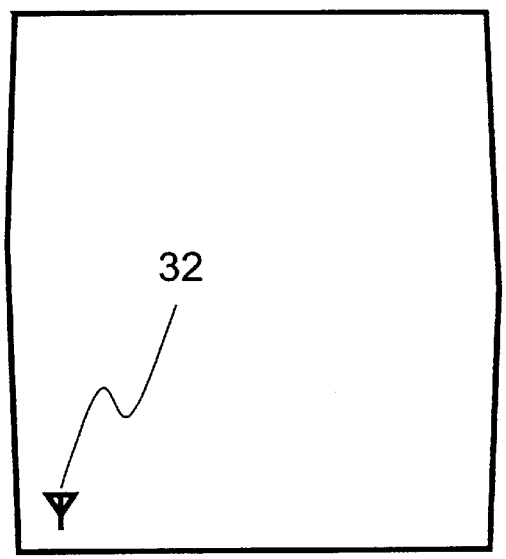
Figure 3C:
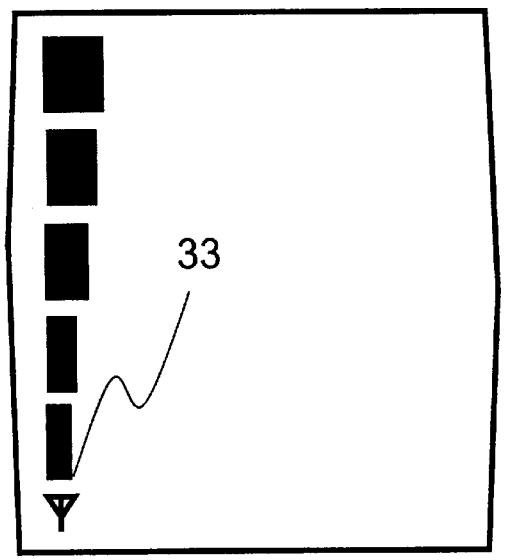
Figure 3D:
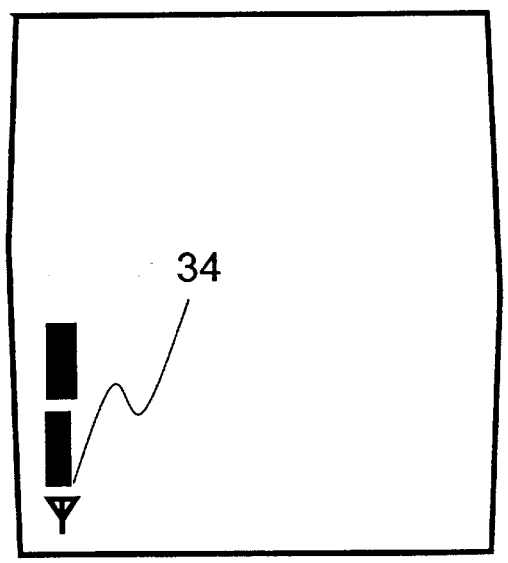
Figure 4:
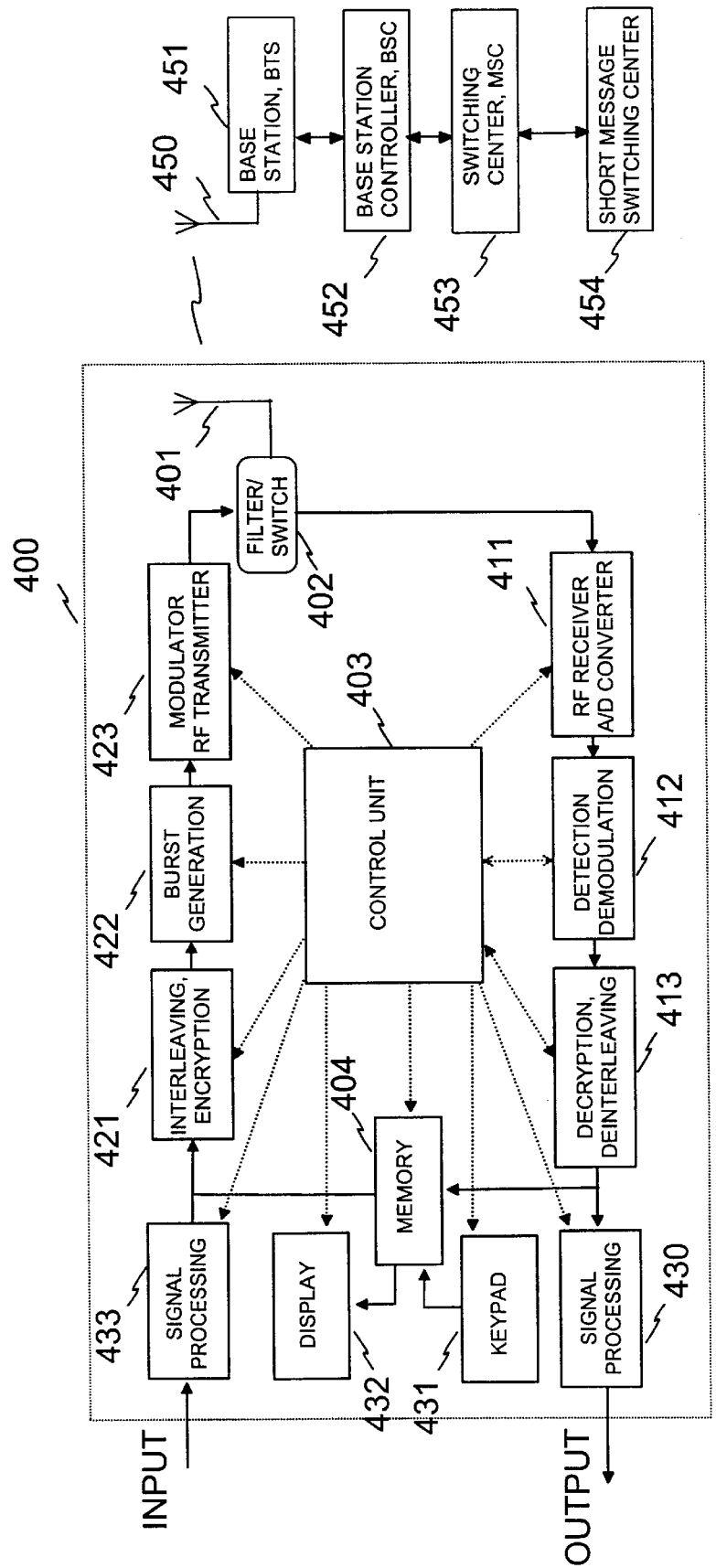

The invention will now be described in detail. Reference will be made to the accompanying drawing wherein FIG. 1 illustrates by way of example the situation according to the prior art with two different services, FIG. 2a illustrates by way of example the indication of field strength at point $P_1$ according to the prior art, FIG. 2b illustrates by way of example the indication of field strength at point $P_2$ according to the prior art, FIG. 3a illustrates by way of example the virtual field strength indication according to the invention at point $P_1$ at 9.6 kbps, FIG. 3b illustrates by way of example the virtual field strength indication according to the invention at point $P_1$ at 14.4 kbps, FIG. 3c illustrates by way of example the virtual field strength indication according to the invention at point $P_2$ at 9.6 kbps, FIG. 3d illustrates by way of example the virtual field strength indication according to the invention at point $P_2$ at 14.4 kbps, and FIG. 4 shows the main functional components of the mobile station and base station according to the invention.

FIGS. 1, 2a and 2b were discussed in connection with the description of the prior art.

In conjunction with the description of the prior art problems were discussed in relation to the measurement and indication of the absolute field strength. Modern cellular networks offer more and more versatile services that require fast data transmission. The invention relates to these novel already existing and possible future services that require faster data transmission than the basic services of the GSM network. The introduction of faster data transmission means that the channel coding techniques have to be changed. This, in turn, means that the received signal must have a greater field strength than that required by a basic GSM service.

When using the method according to the invention, each service offered in the cellular network in question is defined a minimum field strength which is read into a memory unit in the mobile station. The memory unit may be the storage unit of the mobile station proper or a so-called SIM card (Subscriber Identity Module) or some other smart card, MultiMedia Card or the like. The measured absolute field strength value is adjusted by a service-specific value, a kind of an offset value (Off), known to the mobile station. That service-specific value may be stored either in the mobile station's memory or in a card like those mentioned above. The value representing the absolute field strength measured by the mobile station is adjusted by the service-specific value so that a virtual field strength of that particular service can be calculated and, if necessary, indicated at the mobile station. The service-specific value may be a value that is added to or subtracted from the measured field strength value or a coefficient by which the measured field strength is multiplied or a combination of these alternatives.

In a preferred embodiment the virtual field strength (Pvr) can be determined as the difference of the measured field strength value (Pr) and the service-specific value (Off) as follows:

$$Pvr=Pr-Off.$$

In addition to fixed service-specific values it is possible to use e.g. SMS messages (Short Message Service) or other messages converted from them to set/change, if necessary, the service-specific values in the mobile station according to the network load and usage. Thereby, in an embodiment, emergency calls could be placed in very difficult conditions and in a weak field if the network by means of the offset parameters in an SMS message forces the other callers to use lower transmission power for the duration of the emergency call. In another embodiment users may be allowed, for an extra charge, to use a transmission power higher than normal and, this way, ensure that the pay service in question will be carried out successfully.

Table 1 shows by way of example how the service-specific values (Off) in the embodiment described above could be categorized on the basis of the transmission rate required for the connection. There may be other service classes, transmission rates and service-specific values than those presented in Table 1.

TABLE 1

Exemplary transmission rates and service-specific values

| Service code | Transmission rate (kbps) | Service-specific value (Off/dB) |
|---|---|---|
| 0 | 9.05 | 0 |
| 1 | 13.4 | 5 |
| 2 | 15.6 | 10 |
| 3 | 21.4 | 20 |

The values in Table 1 are exemplary only. There may be services for other transmission rates, too, that can be defined using service-specific values. In addition, the value of the offset parameter may be based, as described earlier, on the nature of the service (emergency call, for example) or on the extra charge paid by the user.

Using the values in Table 1 as examples, there is no need to change the measured absolute field strength when using service 0, which requires a transmission rate of 9.05 kbps. On the other hand, when using service 3, which requires a transmission rate of 21.4 kbps, the measured absolute field strength value has to be decreased by 20 dB. The result computed is compared to the field strength value required for the service in question. Based on the result of the calculation the user of the mobile station or the mobile station itself determines whether the connection can be established or not.

The virtual field strength according to the invention can be indicated to the user e.g. as shown in FIGS. 3a, 3b, 3c and 3d. In the exemplary situation depicted by FIGS. 3a and 3b the mobile station is located at point $P_1$ shown in FIG. 1. In the example of FIG. 3a, the field strength indication 31 represents the virtual field strength according to service 0 at point $P_1$. The service-specific value for that service is 0 dB, so the virtual and absolute field strength values are equal. The field strength indication 31 indicates to the user that the field strength is sufficient for the desired service. Thus the user can take action to set up the connection.

The example depicted in FIG. 3b shows a virtual field strength indication 32 calculated for service 3 in Table 1. As the absolute field strength has been numerically adjusted downwards by 20 dB, there is no sufficient field strength for service 3 at point $P_1$. Therefore, the virtual field strength according to the invention displayed by the mobile station indicates that the field strength at that particular location is not sufficient for the service in question. The user has to either use slower services or move to a more advantageous location where the faster data transmission link will function.

The examples of FIGS. 3c and 3d depict virtual field strength indication according to the invention at point $P_2$. In the case depicted in FIG. 3c the mobile station uses service 0 of Table 1. The virtual field strength indication 33 according to the invention shows that the field strength is sufficient for service 0 at point $P_2$.

The example of FIG. 3d shows the virtual field strength value calculated at the same point $P_2$ for service 3 of Table 1. In accordance with the invention the measured absolute field strength is decreased by 20 dB, but in spite of that the virtual field strength indication 34 shows a sufficient field strength at point $P_2$ for data transmission required by service 3.

The mobile station may indicate the measured virtual field strength in other ways, too. In an embodiment the display of the mobile station may contain several field strength symbols simultaneously. Thus the user can immediately deduce what services the mobile station is able to use at that location. In another embodiment different services can be distinguished by means of differently colored field strength symbols. In another embodiment there is near the field strength symbol an identifier of the service the virtual field strength of which the mobile station is indicating.

Several services, such as GPRS and HSCSD services, are about to be added to cellular networks. Furthermore, plans are being made for the implementation of a completely new network called the Universal Mobile Telecommunication System (UMTS) in which it is possible to transmit real-time video in addition to speech and data. Such services offered in an UMTS cellular network require a sufficient field strength between the mobile station and base station. On the other hand, the same cellular network may offer services that require a field strength which is considerably weaker than that required by some other service. Use of one and the same transmission power all the time wastes battery energy in services that would manage with a lower field strength. Moreover, lower field strengths cause less interference to the other users in the same cellular network. The increased selection of services offered in cellular networks brings with it problems the effects of which can be reduced by the method according to the invention. By using the method according to the invention the operation of a cellular network can be improved as regards both an individual mobile station user and the network itself.

FIG. 4 shows by way of example a simplified block diagram of a mobile station 400 according to the invention, advantageously a mobile communication device, and its connection to a cellular telephone network. The mobile communication device comprises an antenna 401 for receiving radio-frequency (RF) signals transmitted by base stations. The received RF signal is directed by a switch 402 to a RF receiver 411 where the signal is amplified and converted digital. The signal is then detected and demodulated in block 412. The field strength data of the detected signal are taken to a control unit 403. The control unit computes the virtual field strength using offset parameter data obtained from a storage means 404 which may be either a memory in a SIM card or a memory unit in the apparatus itself. The computed field strength is displayed to the user on a display 432. Block 413 performs decryption and deinterleaving on the received data. Then follows signal processing in block 430. The received data may be read as such into a memory means 404 available to the mobile communication device or, alternatively, the processed packet data are taken after the signal processing to a possible external apparatus such as a computer. The control unit 403 controls the above-mentioned reception blocks in accordance with a program stored in the unit.

Transmission from the mobile communication device is performed e.g. as follows. Controlled by the control block 403, block 433 performs possible signal processing on the data and block 421 performs interleaving and encryption on the processed signal to be transmitted. Bursts are generated from the encoded data, block 422, which are modulated and amplified into a RF signal to be transmitted, block 423. The control unit controls the power consumption of the transmitter on the basis of the offset parameters and field strength measurement results. It is also possible that a base station forces a transmission power on the mobile station. This transmission power may already include the offset or the offset may be added/subtracted in the mobile station. The RF signal to be transmitted is lead to the antenna 401 via switch 402. The processing and transmission functions described above are controlled by the control unit 403.

In the exemplary mobile station of FIG. 4, the components that are essential from the invention's perspective include the prior-art reception blocks 411–413, by means of which the mobile station receives, demodulates and decodes the messages sent by base stations and measures the power levels of the received signals, as well as the control block 403 which processes the information contained in the messages and controls the operation of the mobile station. Part of the memory means 404 available to the mobile station has to be reserved for information relating to service-specific values. Naturally, it is possible to use for that same purpose a removable memory means attached to the mobile station, such as a prior-art SIM card or some other smart or memory card.

The hardware requirements imposed by the invention on base stations are minimal compared to the prior art. Base station 451 and/or base station controller BSC 452 have access to a database (not shown in FIG. 4) containing information about mobile stations within the service areas of different cells, their service needs and current field strength values. If necessary, the base station may carry out transmission power control operations as regards both the transmission power of the base station itself and the transmission power used by the mobile station. Base stations 451 according to the prior art generate and send forward various messages. In the case of a SmartSMS message, for example, the messages are first sent to a short message switching center SM-SC 454. The short message switching center 454 may convert the message into another message used in the cellular network, if necessary. The short message switching center 454 sends the message to the cellular network wherefrom the messages are first directed to a mobile switching center MSC 453 of the cellular network. As the location of the mobile station 400 is known to the cellular network the switching center 453 is able to direct the message via a suitable base station controller 452 to a base station 451 that best serves the mobile station. The base station 451 forwards the message via the radio path 450 to the designated mobile station 400.

The embodiments described above are naturally exemplary only and do not limit the application of the invention. Particularly it should be noted that although the examples described above are mainly related to the GSM system, the invention is applicable to any other digital cellular system. Especially the DCS1800 (Digital Communications System at 1800 MHz), IS-54 (Interim Standard 54) and PDC (Personal Digital Cellular) systems could be mentioned as examples. Particularly in forth-coming so-called third-generation digital cellular systems the service levels offered by the cells to the mobile stations may considerably differ from a cell to another. Proposed third-generation systems include the Universal Mobile Telecommunications System (UMTS) and the Future Public Land Mobile Telecommunications System/International Mobile Telecommunications at 2000 MHz (FPLMTS/IMT-2000). In these proposed systems the cells are divided according to their size and characteristics into different-sized cells, and the transmission rate can be used as an example of the service level. Picocells have the highest transmission rate and macrocells the lowest. The cells may partly or totally overlap and there may be different mobile stations, so that all mobile stations may not be able to use the service levels of all base stations.

What is claimed is:

1. A method for measuring the field strength of a signal received by a mobile station operating in a cellular network, said network providing advanced services, said advanced services requiring increased rates of data transmission, in which method the field strength of a signal received by a mobile station is measured and on the basis of the measured field strength, a field strength is calculated for obtaining a determination of availability of an advanced service, which is a service other than the service currently used by the mobile station.

2. The method of claim 1, wherein said received signal field strength is adjusted by subtracting or adding a certain service specific value from or to the value representing the measured field strength.

3. The method of claim 2, wherein said service specific value used in the calculation of said value representing the received signal field strength is specific to each service offered in the cellular network.

4. The method of claim 3, wherein said service specific value is read from a memory means in the mobile station.

5. The method of claim 3, wherein said service specific value is read from a separate memory means attached to the mobile station.

6. The method of claim 3, wherein the service specific value is communicated to the mobile station via the cellular network.

7. The method of claim 6, wherein said service specific value is transferred in an SMS message.

8. The method of claim 6, wherein said service specific value is transferred in a message converted from an SMS message.

9. The method of claim 1 wherein the another service is a service similar to a current service.

10. The method of claim 1 wherein the another service is an advanced service.

11. The method of claim 1 wherein said field strength is representing the received signal field strength.

12. The method of claim 1, said field strength is calculated and represented as a received signal field strength.

13. The method of claim 1, wherein a value representing the received signal field strength is adjusted in accordance with a predetermined factor determined on the basis of said advanced service.

14. A mobile station in a cellular telephone system, arranged to operate in a cellular network, said network providing advanced services, said advanced services requiring increased rates of data transmission, wherein said mobile station has means for:

sending and receiving signals, measuring the field strength of a signal, reading data from a memory means, and controlling the transmission power of a mobile station, further comprising:

means for calculating a value representing the received signal field strength, means for setting a minimum value for the field strength of a signal received by the mobile station based on said advanced service; and means for calculating a field strength for determining the availability of said advanced service, as based on measured field strength, said advanced service being other than the service currently used by the mobile station.

15. The mobile station of claim 14, wherein service specific values for calculating the value representing the received signal field strength for that particular service are readable in the mobile station.

16. The mobile station of claim 15, wherein the mobile station is adapted so as to read said service specific values from the memory means of the mobile station itself.

17. The mobile station of claim 15, wherein the mobile station is adapted so as to read said service specific values from a memory means attached to the mobile station.

18. The mobile station of claim 15, wherein the mobile station is adapted so as to read said service specific values from messages received through a cellular network.

19. The mobile station of claim 18, wherein said received messages are SMS messages.

20. The mobile station of claim 18, wherein said received messages have been converted from SMS messages.

21. A base station in a cellular radio system, arranged to operate in a cellular network, said network providing advanced services, said advanced services requiring increased rates of data transmission, said base station, having:
   means for providing a service;
      means for forwarding, generating and sending messages to mobile stations, and
      means for storing various parameter data of a cellular network,
      further comprising means for
         communicating to mobile stations a service specific value needed in the calculation of the value representing the received signal field strength,
         controlling the transmission power on the basis of service specific values; and
         providing a field strength for said advanced service, said advanced service being other than the service currently used by the mobile station.

22. A cellular radio system, operating in a cellular network, said network arranged to provide advanced services, said advanced services requiring increased rates of data transmission, said cellular radio system having switching centers, base station controllers, base stations and mobile stations, said cellular radio system further arranged, such that
   the base stations are provided with means for generating messages and sending them to mobile stations, and
   the mobile stations are equipped so as to operate on said advanced service level and receive said messages,
   wherein the cellular radio system comprises accessible information about field strength specific values allowed for said advanced services in the cellular network and said system is arranged so as to transmit said information from a base station to a mobile station for the calculation of a value representing the field strength of the received signal based on said advanced service, said advanced service being other than the service currently used by the mobile station.

23. A method for measuring the field strength of a signal received by a mobile station operating in a cellular network, said network providing at least one advanced service for selection by the user of a mobile station, said at least one advanced service requiring increased rates of data transmission, in which method, the field strength of a signal received by a mobile station is measured and compared to a field strength value consistent with said increased rate of data transmission, wherein said measured field strength is adjusted in accordance with a predetermined factor on the basis of the said at least one advanced service selected by the user of the mobile station, said service selected being other than the service currently used by the mobile station.

* * * * *